US009223018B2

(12) United States Patent
Dayi et al.

(10) Patent No.: US 9,223,018 B2
(45) Date of Patent: Dec. 29, 2015

(54) METHOD FOR DISPLAYING AN ACTIVE RADAR IMAGE AND HANDHELD SCREENING DEVICE

(71) Applicant: Sony Corporation, Minato-ku (JP)

(72) Inventors: Furkan Dayi, Stuttgart (DE); Ralf Boehnke, Esslingen (DE); Miquel Testar, Stuttgart (DE); Marcel Blech, Herrenberg (DE); Qi Wang, Esslingen (DE)

(73) Assignee: SONY CORPORATION, Tokyo (JP)

( * ) Notice: Subject to any disclaimer, the term of this patent is extended or adjusted under 35 U.S.C. 154(b) by 209 days.

(21) Appl. No.: 14/058,354

(22) Filed: Oct. 21, 2013

(65) Prior Publication Data

US 2014/0168008 A1     Jun. 19, 2014

(30) Foreign Application Priority Data

Dec. 19, 2012   (EP) .................................. 12008450

(51) Int. Cl.
*G01S 13/89*    (2006.01)
*G01S 13/04*    (2006.01)
*G01S 13/88*    (2006.01)
G01S 13/00     (2006.01)
G01S 13/90     (2006.01)

(52) U.S. Cl.
CPC ............... *G01S 13/89* (2013.01); *G01S 13/887* (2013.01); *G01S 13/9035* (2013.01)

(58) Field of Classification Search
CPC ....... G01S 13/88; G01S 13/887; G01S 13/89; G01S 13/90; G01S 13/9035; G01S 7/02; G01S 7/41; G01S 7/411; G01S 7/412; G01S 13/02; G01S 13/86; G01S 13/87; G01S 13/872; G01S 13/888; G08B 13/18; G08B 13/189; G08B 13/194; G08B 13/196; G08B 13/19654; G08B 13/19656
USPC .......... 342/21, 22, 25 R–25 F, 27, 28, 89, 91, 342/118, 175, 195, 176; 340/531, 539.1, 340/539.11
See application file for complete search history.

(56) References Cited

U.S. PATENT DOCUMENTS

| | | | | |
|---|---|---|---|---|
| 5,345,240 A * | 9/1994 | Frazier | .................. | G01S 13/888 342/22 |
| 5,644,314 A * | 7/1997 | Ahmad | .................... | G01S 7/412 342/22 |
| 6,417,797 B1 | 7/2002 | Cousins et al. | | |
| 6,720,905 B2 * | 4/2004 | Levitan | .................. | G01S 13/872 342/179 |
| 6,950,054 B1 * | 9/2005 | Steinway | ................ | G01S 13/04 342/22 |
| 6,967,612 B1 * | 11/2005 | Gorman | .................. | G01S 7/412 342/175 |

(Continued)

OTHER PUBLICATIONS

Xaver™ 800, "High Preformance ISR Through-Wall Imaging System", 2013, 2 pages.

(Continued)

*Primary Examiner* — Bernarr Gregory
(74) *Attorney, Agent, or Firm* — Oblon, McClelland, Maier & Neustadt, L.L.P.

(57) ABSTRACT

A method for displaying an active radar image of an object on a handheld screening device is provided comprising taking a sequence of active radar images of an object, the different active radar images of the sequence being representative for different distances of the object from the handheld screening device; selecting an image of the sequence of active radar images; and displaying the selected image on a display. A corresponding handheld screening device is provided as well.

17 Claims, 4 Drawing Sheets

(56) References Cited

U.S. PATENT DOCUMENTS

| | | | |
|---|---|---|---|
| 7,209,035 B2 * | 4/2007 | Tabankin | G08B 13/19656 340/539.11 |
| 7,518,542 B1 * | 4/2009 | Steinway | G01S 7/412 342/22 |
| 7,956,794 B2 * | 6/2011 | Skultety-Betz | G01S 13/86 342/22 |
| 7,973,704 B2 | 7/2011 | Storz et al. | |
| 7,978,124 B2 * | 7/2011 | Cook | G01S 13/888 342/22 |
| 8,068,049 B2 | 11/2011 | Salmon et al. | |
| 8,253,619 B2 * | 8/2012 | Holbrook | G01S 13/86 342/175 |
| 8,593,329 B2 * | 11/2013 | Mohamadi | G01S 13/888 342/22 |
| 2009/0195435 A1 * | 8/2009 | Kapilevich | G01S 13/04 342/22 |
| 2010/0117885 A1 | 5/2010 | Holbrook et al. | |
| 2010/0302240 A1 | 12/2010 | Lettvin et al. | |

OTHER PUBLICATIONS

Brijot "AllClear", Product Presentation, http://www.brijot.com/index.php/products/allclear , Mar. 9, 2012, 2 pages.

* cited by examiner

METHOD FOR DISPLAYING AN ACTIVE RADAR IMAGE AND HANDHELD SCREENING DEVICE

BACKGROUND

1. Field of the Disclosure

The present disclosure relates to a method for displaying an active radar image and a handheld screening device.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target. Ultrasound imaging systems, in turn, require the presence of a continuous, high quality acoustic transmission path between a transducer and a "hidden" object of interest. In many cases, however, such acoustic transmission paths may be not available and depending on the medium the resolution may be very coarse.

Millimeter-wave imaging systems have recently been developed for securing screening applications. Millimeter-waves are particular useful for detecting objects in an active radar system, i.e. by emitting electromagnetic waves in the millimeter-wavelength region and detecting and processing/analyzing reflected or scattered electromagnetic waves.

There is a need to further improve the usability of handheld screening devices based on millimeter-wave imaging systems.

SUMMARY

A method for displaying an active radar image of an object on a handheld screening device is provided including taking a sequence of active radar images of an object, the different active radar images of the sequence being representative for different distances of the object from the handheld screening device; selecting an image of the sequence of active radar images; and displaying the selected image on the display.

Further, a handheld screening device is provided including an active radar scan unit to take a sequence of active radar images of an object, the different active radar images of the sequence being representative for different distances of the object from the handheld screening device; a processor to select an image of the sequence of active radar images; and a display to display the selected image.

Further, a method for operating a handheld screening device is provided including taking a radar image of an object; evaluating a distance of the object to the handheld screening device based on the radar image; and generating a warning indication if the distance is below a predetermined threshold.

Further, a handheld screening device is provided including an active radar scan unit to take a radar image of an object; a distance evaluation sensor to evaluate a distance of an object to the handheld screening device; and a warning unit to emit a warning signal if the distance of the handheld screening device is too close to the object.

The foregoing paragraphs have been provided by way of general introduction, and are not intended to limit the scope of the following claims. The described embodiments, together with further advantages, will be best understood by reference to the following detailed description taken in conjunction with the accompanying drawings. The elements of the drawings are not necessarily to scale relative to each other.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
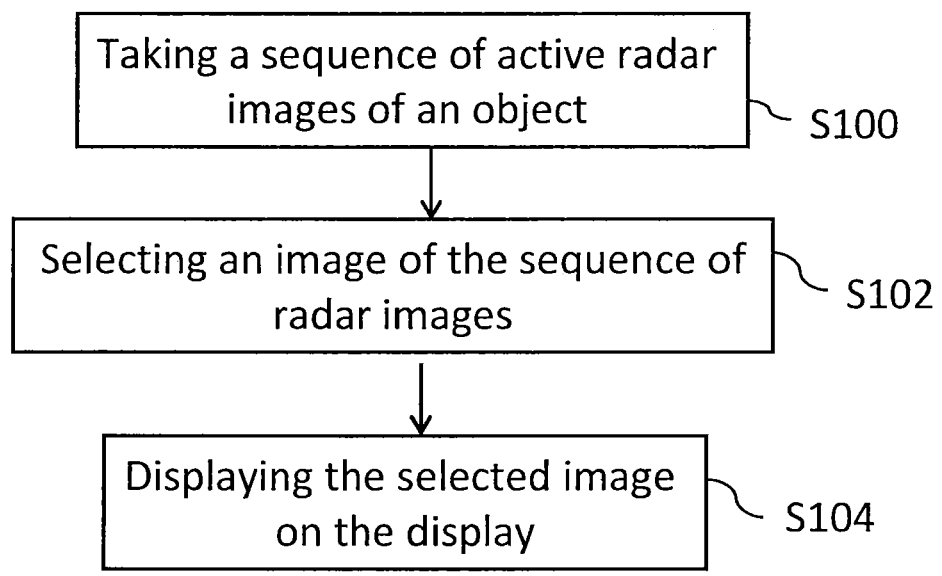
FIG. 1 shows schematically method steps according to an embodiment of the invention.

Referring now to the drawings, wherein like reference numerals designate identical or corresponding parts throughout the several views, FIG. 1 depicts steps of a method for generating an image according to an embodiment of the invention.

In a step S100 a sequence of active radar images of an object is taken, the different active radar images of the sequence being representative for different distances of the object from the handheld screening device.

The term "handheld" used throughout the description might be understood to describe a device that can be carried (i.e. it is mobile) and operated by one or two hands and has preferably a weight less than 3 kg. A "handheld" device should approximately have geometrical dimensions (height, width, length) and weight as objects that are normally operated and/or carried by a person using one hand or two hands. Examples for such objects are, a book, a smart phone, a cellular phone, an electronic reader, a tablet computer, a notebook computer, a stand still camera, a video camera, binoculars etc. Nevertheless, it should be understood that the device itself might be suited to be handheld, but in a particular application is mounted on a tripod or is otherwise fixed to a support when a stationary use of the device is envisaged.

The different active radar images are also referred to as layers. The visualized distance layer can be changed by changing an algorithm to process received reflected radar waves. E.g. using SAR (Synthetic Aperture Radar) technique, the device can focus to different layers of the image and focused images (layers) can be computed and shown individually. As another example advanced beam forming methods can concentrate the electromagnetic energy to be emitted and detected to specific distance layers.

An active radar image can be taken e.g. by an active millimeter-wave sensor or a radar scan sensor. The active radar image is generated by emitting electromagnetic waves in an extended millimeter-wavelength region from a radar source, e.g. a handheld screening device or an active radar scan unit to an object and detecting electromagnetic waves reflected or scattered from the object. The frequency of the millimeter wavelength region radiation is considered to be within 10 GHz to 500 GHz.

The term "image" as used throughout the description includes any information (reflectivity, depth, shape, contours, polarimetric scattering, polarization change etc.) that can be derived from evaluating the reflected or scattered electromagnetic waves.

In order to get a one- or two-dimensional image, a position of the radar source (and of a capture unit for reflected or scattered electromagnetic waves) should be moved with respect to a position of the object. For instance, it is possible to move the radar source in order to change its position. A further possibility is changing emission direction of the radar electromagnetic wave e.g. by a moving reflector or grating or some electronic beamforming method.

In step S102 an image of the sequence of radar images is selected. Since it is difficult to display a sequence of images on a two-dimensional display easily, in this step one of the images or layers is selected that is considered the most important layer or image of the sequence of images. The most important or "best" layer might e.g. be the layer or image with the highest reflectivity (e.g. summed over the image) or the "first" image or layer, i.e. the first image of the sequence of images that has a reflectivity (e.g. summed over the image) above a predetermined threshold.

Hence, with the proposed method it is possible to provide information of a three-dimensional image with the visualization as a two-dimensional image.

Then in a step S104 the selected image is displayed on the display, e.g. a screen.

Before displaying the selected image further image processing might be performed, e.g. by calculating and displaying outlines, pictograms, shapes etc.

Figure 2:
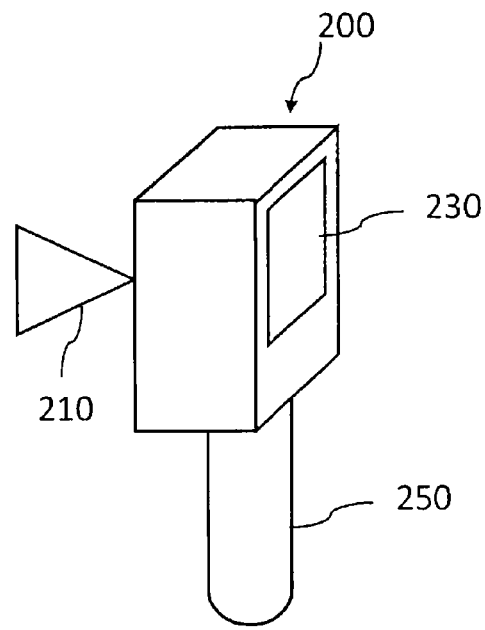
FIG. 2 shows schematically a perspective view of a handheld screening device according to an embodiment of the invention.
Figure 3:
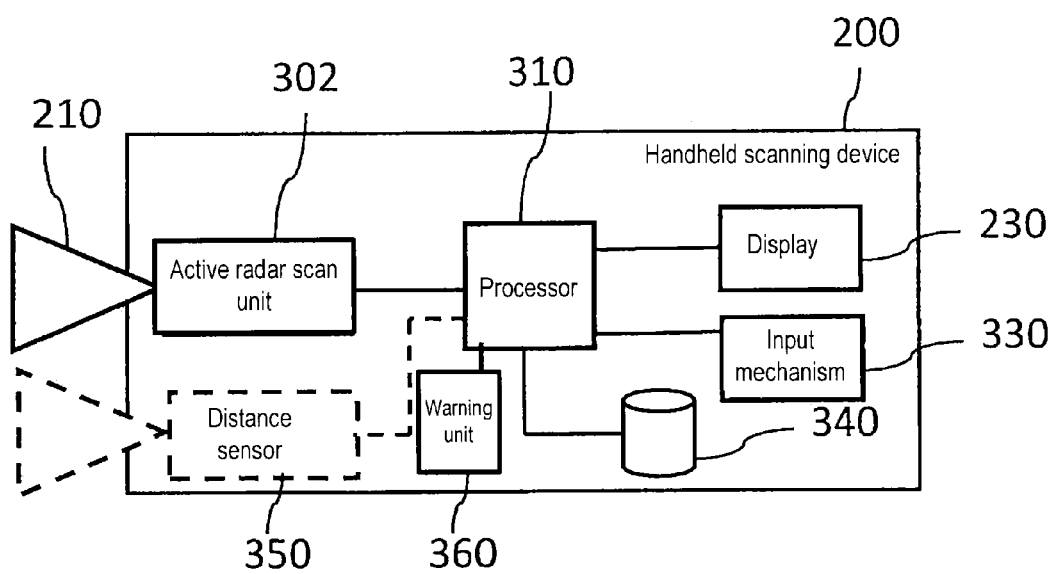
FIG. 3 shows schematically a block diagram of a handheld screening device according to an embodiment of the invention.

FIG. 2 depicts a perspective view and in FIG. 3 a schematic block diagram of a handheld screening device 200 is depicted.

The handheld screening device 200 includes an active radar scan unit 302 adapted to emit a radar signal and to receive reflected radar signals, which might be emitted in a cone form 210. Consequently, the active radar scan unit 302 is adapted to generate the sequence of images from the object.

A processor 310 is included in the handheld screening device 200, which controls the active radar scan unit 302 and is configured to select an image of the sequence of images.

The handheld screening device 200 further includes a display 230 adapted to display the selected image.

A grip 250 is provided so that a user can hold the handheld screening device 200 with one hand and can operate it easily.

Further, the handheld screening device 200 might include an input mechanism 330. The input mechanism 330 allows the user to input selection criteria that are used by the processor 310 to select the layer that should be displayed on the display 230. For instance, the user can decide whether the image or layer should represent the image or layer with the highest reflectivity or the first image or layer that includes a reflectivity above a predetermined threshold. The input mechanism 330 might include a mouse, a touchscreen, a keyboard, a track-ball or any other known input mechanism.

The processor 310 could also decide what the best image is based on its quality (i.e. by contour analysis, variance . . . )

The handheld screening device might further include a storage unit or memory 340, e.g. a hard disk, a solid-state memory, a memory card or any other known storage unit. The memory 340 can be used to store predetermined threshold values for determining the first image or layer, and it can also be adapted to store as a default, whether the image with the highest reflectivity of the sequence of images or the first image with a reflectivity above a predetermined threshold is displayed.

In addition the handheld screening device 200 might include a distance sensor 350 to detect a distance to the object and a warning unit 360 adapted to output a warning message or signal, if the distance between the object and the handheld screening device 200 is too short so that the active radar image can not be taken properly. The distance sensor 350 might be realized as an FMCW (frequency modulated continuous wave) radar or pulse radar or any other distance sensor. It is also possible to use information derived from scattered or reflected electromagnetic waves that are emitted by antennas of the handheld screening device, so that the same antennas might be used for performing the active radar scan and measuring the distance.

Figure 4:
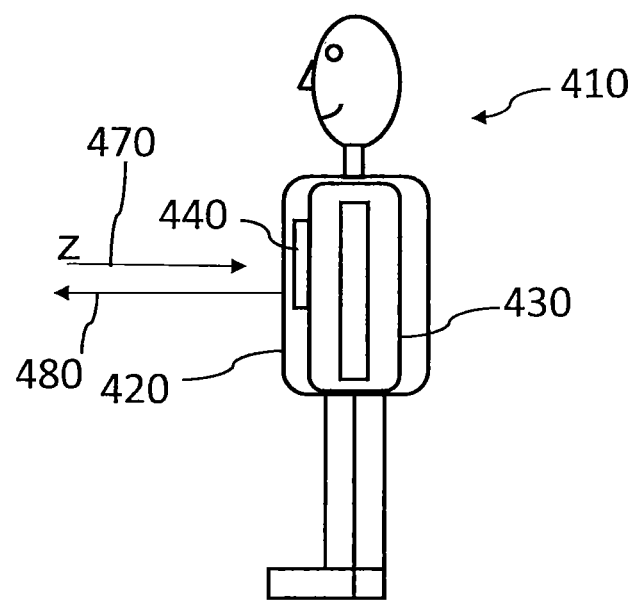
FIG. 4 shows schematically how an active radar image of a person is taken.
Figure 5:
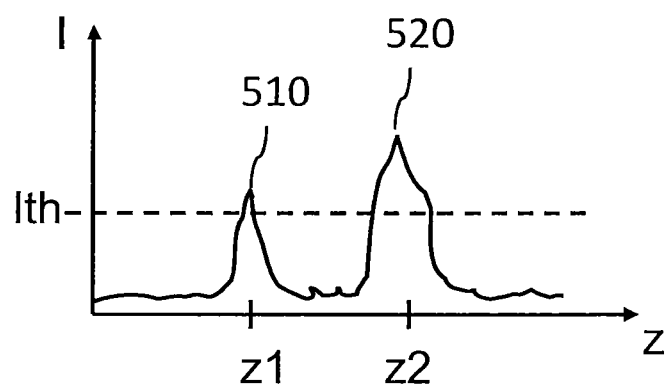
FIG. 5 shows schematically a representation of the reflected signal intensity as a function of distance between the handheld screening device and an object.

In FIGS. 4 and 5 it is schematically depicted how the image is selected among the sequence of images. In FIG. 4 a person 410 is depicted as an example for an object that should be investigated by the handheld screening device 200. The person 410 wears some clothes 420 above his body 430. In the example the person 410 tries to hide a device, e.g. a gun 440 between his body 430 and his clothes 420.

When radar signals 470 are emitted in a z-direction towards the person 410, a part of 480 the radar signals is reflected by the hidden object and the person and detected by the handheld screening device 200.

In FIG. 5 the reflected signal intensity I (e.g. a mean value of the image values or a summed value) is depicted versus the z-direction. As can be observed, the signal intensity includes a first relative maximum 510 at a first position z1 and a second relative maximum 520 at a second position z2.

According to an embodiment the first relative maximum 510 is detected by evaluating at which z-position the intensity I is above a predetermined threshold value Ith. Of course, the predetermined threshold value Ith might be a threshold value stored in the storage unit 340 or might be input via the input mechanism 330 or could also be automatically adapted by means of well known techniques (e.g. CFAR=Constant False Alarm Rate. Here the detection algorithm is adapted to result in user defined false alarm rate, e.g. 5% which means that in 5% of the cases a 'target' is identified, however, no target is present in the scanned scene).

The first relative maximum 510 is determined and the image or layer corresponding to the first relative maximum 510 is displayed on the display 230.

According to a further embodiment the second relative maximum 520 corresponds also to an absolute maximum of reflected intensity or reflectivity. Consequently, the image corresponding of the sequence of images corresponding to the second position z2 can be determined by evaluating the summed intensities of the different images or layers and can be displayed on the display 230.

Both modes, i.e. the "first layer mode" or the "highest reflectivity layer" mode can be used to identify hidden objects, as e.g. the gun 440 depicted in FIG. 4. For the example with the gun 440, considering that a gun made of metal normally has a very high reflectivity for radar waves, it would be appropriate to select the image with the highest reflectivity layer to be displayed in order to find the gun in a security environment.

Figure 6:
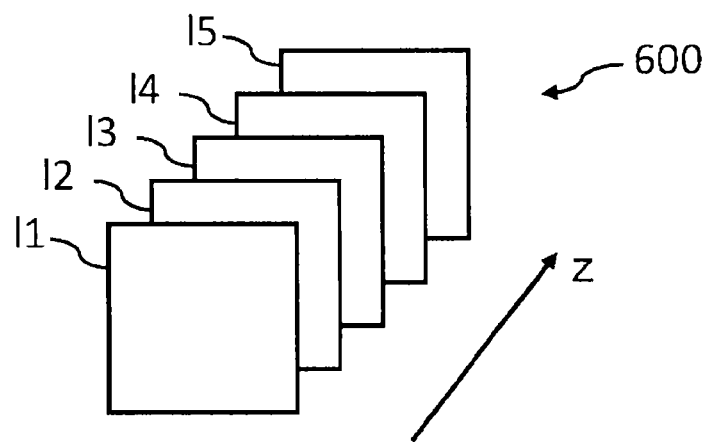
FIG. 6 shows schematically a sequence of images.

FIG. 6 exemplarily shows a sequence of images 600, including a first to fifth image or layer I1, I2, I3, I4, I5 versus the z-direction.

Figure 7:
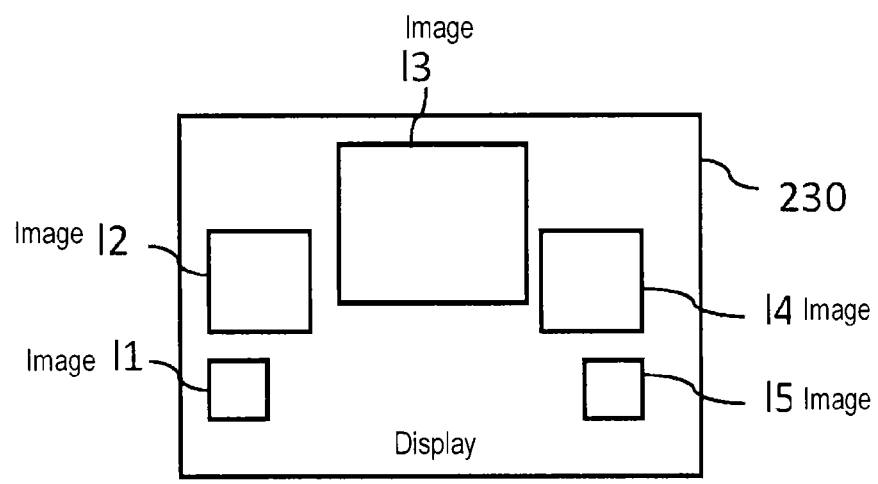
FIG. 7 shows schematically a displayed sequence of images according to an embodiment of the invention.

If, for instance, the third image or layer I3 is considered the selected image that should be displayed on the display 230 it is possible to display the adjacent images I1, I2, I4 and I5 together with the selected image I3 as it is depicted in FIG. 7. In this example the images or layers I1, . . . , I5 are arranged in a semi-circle, the selected image I3 being the largest image and the other images or layers I1, I2, I4, and I5 being displayed smaller and in the corresponding order that is the order of the images or layers in the sequence 600.

The objects can include human beings wearing clothes, suitcases or boxes or any other object that can be used to hide a device as described hereinbefore. Whereas it should be understood that the devices/items might be searched for due to security reasons (i.e. weapons or dangerous items), it is equally well possible that certain unwanted items should be identified due to other reasons, for instance, an organizer of a festival is searching for bottles of liquids (an 'unwanted item' in this scenario), since he wants to forbid bringing such bottles into the festival, because he wants to sell his own products.

Obviously, numerous modifications and variations of the present disclosure are possible in light of the above teachings. It is therefore to be understood that within the scope of the appended claims, the invention may be practiced otherwise than as specifically described herein.

The present application claims priority to European Patent Application 12 008 450.4, filed in the European Patent Office on Dec. 19, 2012, the entire contents of which being incorporated herein by reference.

The invention claimed is:

1. Method for displaying an active radar image of an object on a handheld screening device, comprising:
   taking a sequence of active radar images of an object, the different active radar images of the sequence being representative for different distances of the object from the handheld screening device;
   selecting an image of the sequence of active radar images;
   displaying the selected image on a display.

2. Method according to claim 1, further comprising:
   generating selection criteria; and
   using the selection criteria when selecting the image of the sequence.

3. Method according to claim 2, wherein the selection criteria are generated based on a user input.

4. Method according to claim 2, wherein the selection criteria are based on predetermined criteria.

5. Method according to claim 2, wherein the selection criteria are generated to select the image with the highest reflectivity of the object.

6. Method according to claim 2, wherein the selection criteria are generated to select the image closest to the handheld screening device that includes signals above a predetermined threshold.

7. Method according to claim 1 further comprising:
   displaying images of the sequence that are adjacent to the selected image in an order according to an order of the sequence.

8. Method according claim 1 further comprising:
   evaluating a distance of the object to the handheld screening device based on the radar image;
   generating a warning indication if the distance is below a predetermined threshold.

9. Handheld screening device including
   an active radar scan unit to take a sequence of active radar images of an object, the different active radar images of the sequence being representative for different distances of the object from the handheld screening device;
   a processor to select an image of the sequence of active radar images; and
   a display to display the selected image.

10. Handheld screening device according to claim 9, wherein the processor is further configured to generate selection criteria; and to use the selection criteria when selecting the image of the sequence.

11. Handheld screening device according to claim 10, further comprising
   an input mechanism to input the selection criteria.

12. Handheld screening device according to claim 10, wherein the processor is further configured to generate the selection criteria are based on predetermined criteria.

13. Handheld screening device according to claim 10, wherein the processor is further configured to generate the selection criteria to select the image with the highest reflectivity of the object.

14. Handheld screening device according to claim 10, wherein the processor is further configured to generate the selection criteria to select the image closest to the handheld screening device that includes signals above a predetermined threshold.

15. Handheld screening device according to claim 9, wherein the display is further configured to display images of the sequence that are adjacent to the selected image in an order according to an order of the sequence.

16. Handheld screening device according to claim 9 further comprising
   a distance sensor to evaluate a distance of the object to the handheld screening device; and
   a warning unit to emit a warning signal if the distance of the handheld screening device is too close to the object.

17. Handheld screening device comprising
   an active radar scan unit to take a radar image of an object;
   a distance evaluation sensor to evaluate a distance of an object to the handheld screening device; and
   a warning unit to emit a warning signal if the distance of the handheld screening device is too close to the object.

* * * * *